US006963914B1

(12) United States Patent
Breitbart et al.

(10) Patent No.: US 6,963,914 B1
(45) Date of Patent: Nov. 8, 2005

(54) METHOD AND APPARATUS FOR RETRIEVING A NETWORK FILE USING A LOGICAL REFERENCE

(75) Inventors: Yuri Breitbart, Scotch Plains, NJ (US); Radek Vingralek, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/328,657

(22) Filed: Jun. 9, 1999

Related U.S. Application Data

(60) Provisional application No. 60/098,722, filed on Sep. 1, 1998.

(51) Int. Cl.[7] ............................................. G06F 15/173
(52) U.S. Cl. ....................... 709/226; 709/225; 709/229
(58) Field of Search ................................ 709/200, 217, 709/219, 229, 245, 719, 225, 226; 707/1, 707/4

(56) References Cited

U.S. PATENT DOCUMENTS

| 5,751,961 | A | * | 5/1998 | Smyk ......................... 709/217 |
| 5,828,847 | A | * | 10/1998 | Gehr et al. .................. 709/239 |
| 5,893,116 | A | * | 4/1999 | Simmonds et al. ......... 707/201 |
| 5,968,121 | A | * | 10/1999 | Logan et al. ............... 709/219 |
| 6,012,067 | A | * | 1/2000 | Sarkar .................... 707/103 R |
| 6,052,718 | A | * | 4/2000 | Gifford ....................... 709/219 |
| 6,061,738 | A | * | 5/2000 | Osaku et al. ............... 709/245 |
| 6,078,960 | A | * | 6/2000 | Ballard ....................... 709/229 |
| 6,101,537 | A | * | 8/2000 | Edelstein et al. ........... 709/219 |
| 6,108,656 | A | * | 8/2000 | Durst et al. ................... 707/10 |
| 6,115,741 | A | * | 9/2000 | Domenikos et al. ........ 709/217 |
| 6,134,588 | A | * | 10/2000 | Guenthner et al. ......... 709/226 |
| 6,138,151 | A | * | 10/2000 | Reber et al. ................ 709/219 |
| 6,138,159 | A | * | 10/2000 | Phaal .......................... 709/226 |
| 6,144,999 | A | * | 11/2000 | Khalidi et al. .............. 709/219 |
| 6,154,777 | A | * | 11/2000 | Ebrahim ..................... 709/227 |
| 6,167,427 | A | * | 12/2000 | Rabinovich et al. ........ 709/201 |
| 6,226,654 | B1 | * | 5/2001 | Van Hoff ................. 707/501.1 |
| 6,230,196 | B1 | * | 5/2001 | Guenthner et al. ......... 709/223 |
| 6,243,700 | B1 | * | 6/2001 | Zellweger ...................... 707/3 |
| 6,272,523 | B1 | * | 8/2001 | Factor ........................ 709/201 |
| 6,351,775 | B1 | * | 2/2002 | Yu .............................. 709/238 |
| 6,377,991 | B1 | * | 4/2002 | Smith et al. ................ 709/226 |
| 6,408,296 | B1 | * | 6/2002 | Acharya et al. .............. 707/10 |
| 6,453,350 | B1 | * | 9/2002 | Factor ........................ 709/226 |
| 6,457,060 | B1 | * | 9/2002 | Martin et al. ............... 709/245 |
| 6,505,254 | B1 | * | 1/2003 | Johnson et al. ............. 709/239 |

(Continued)

OTHER PUBLICATIONS

"SNOWBALL : Scalable Storage on Networks of Workstations with Balanced Load", Radek Vingralek, Yuri Breibart and Gerhard Weikum, Distributed and Parallel Databases, 6, pp. 117-156 (1998), Copyright 1998 Kluwer Academic Publishers.

(Continued)

*Primary Examiner*—Saleh Najjar (57) ABSTRACT

A method and apparatus for communicating files over a communications network in which links, such as hyperlinks, to files are logical in nature, rather than physical in nature, i.e., associated with a particular electronic address. An up-to-date replication directory is maintained on each server and each server inserts current physical references corresponding to a file's logical references into a requested parent file, along with a reference to a server selection program, before the parent file is transmitted to the requesting client. The server selection program selects physical references in the order of their likelihood of providing the fastest response. If a queried server does not currently store the file, an alternate server is queried. Servers communicate with each other to create and delete replicas of files and to make corresponding updates to each server's replication directory.

6 Claims, 5 Drawing Sheets

U.S. PATENT DOCUMENTS

| | | | |
|---|---|---|---|
| 6,516,350 B1 * | 2/2003 | Lumelsky et al. | 709/226 |
| 6,539,381 B1 * | 3/2003 | Prasad et al. | 707/10 |
| 6,684,332 B1 * | 1/2004 | Douglas | 713/168 |

OTHER PUBLICATIONS

"Load Control in Scalable Distributed File Structures", Yuri Breibart, Radek Vingralek and Gerhard Weikum, Distributed and Parallel Databases, 4, pp. 319-354 (1996), Copyright 1998 Kluwer Academic Publishers.

"World-Wide Web Proxies", Ari Loutonen and Kevin Altis, Computer Networks and ISDN Systems, 27 (1994), pp. 147-154.

"Introducing Application-Level Replication and Naming Into Today's Web", Michael Baentsch, Georg Molter and Peter Sturm, Computer Networks and ISDN Systems, 28 (1996), pp. 921-930.

"A Caching Relay for the World Wide Web", Steven Glassman, Computer Networks and ISDN Systems, 27 (1994), pp. 165-173.

"A Scalable HTTP Server: The NCSA Prototype", Eric Dean Katz, Michelle Butler and Robert McGrath, Computer Networks and ISDN Systems, 27 (1994) pp. 155-164.

"Replication and Consistency: Being Lazy Helps Sometimes", Yuri Breitbart, Henry F. Korth, In Proceeding of the 16$^{th}$ ACM SIGACT-SIGMOD-SIGART Symposium on Principles of Database Systems, 1997.

* cited by examiner

METHOD AND APPARATUS FOR RETRIEVING A NETWORK FILE USING A LOGICAL REFERENCE

RELATED APPLICATION

This application claims the benefit of U.S. Provisional Application No. 60/098,722, filed Sep. 1, 1998.

FIELD OF THE INVENTION

This invention relates to communications networks, generally, and more particularly to a method of communication within such communication networks and apparatuses for practicing the inventive method.

BACKGROUND OF THE INVENTION

The World Wide Web ("Web") is essentially a distributed depository of data files stored on Web servers connected by a global communications network known as the Internet. Users of the Web may request transmission of files to their own computers, i.e., Web clients, for viewing, storing or printing. Each Web server stores files identified by a universal resource locator (URL) comprising an electronic address. Each URL is a physical reference in that each URL points to a particular server and identifies the location of a single file relative to that server. Many of the files stored on Web servers are documents written in a standard programming language known as hypertext mark-up language (HTML). HTML files are translated for viewing, printing or storing by a Web browser computer program running on the Web clients. The Web browser also communicates with Web servers. Using HTML, an author of such a Web page (a file written in HTML) can designate a specific word, phrase or image in the Web page as a hyperlink. Each hyperlink may be associated with a URL of another Web file. A user's selection of a hyperlink is an initiation of a request for the file located at the electronic address identified by the URL with which the hyperlink is associated. Since each traditional hyperlink is associated with a single URL, each hyperlink is associated with a single file having a particular location on a particular server.

A request for transmission of a file originates at the client and is submitted to a Web server by the Web browser software running on the Web client. In a typical arrangement, the request is forwarded from the Web client to a proxy computer interconnecting the client computer and the server computer. More specifically, the proxy computer then forwards the request over the network to the server computer. Upon a user's selection of a hyperlink, the client's Web browser issues a hypertext transfer protocol (HTTP) request to the Web server identified in the URL associated with the hyperlink. The request is intercepted by the proxy which then relays the request over the Internet to the appropriate Web server. If the requested file resides on the Web server at the electronic address identified in the URL, the Web server responds by transmitting the requested file to the proxy. The proxy then relays the requested file to the Web client.

If the Web server does not have the requested file at the electronic address identified in the URL, the Web server transmits an error message to the Web client via the same path and the client does not receive the requested file. In such a case, the hyperlink associated with the incorrect URL is referred to as a "broken link". This frequently occurs, for example, when a Web page is written such that a hyperlink is established to a file having a particular electronic address (URL) on a server and the file is subsequently deleted or moved on the server. If the Web page is not updated to revise the URL associated with the hyperlink to reflect the file's current electronic address, a broken link results.

The standard HTML syntax of Web pages and the standard HTTP communications protocol supported by the Web guarantee that a Web client and Web browser can communicate with any Web server. The JAVA programming language and JAVA applets allow for platform independent application programs which can be executed by any Web client.

An increasing number of users are using the Internet and the Web to a greater degree. This is leading to progressively poorer performance and lower reliability of Web service. This is particularly the case for widespread distribution of new software releases where many users wish to access the same server or servers during a relatively short period of time. Recently, several solutions have been proposed to reduce Web server response time, improve its reliability, and balance a load among Web servers.

One proposed solution is Proxy Server Caching. In such an arrangement, all clients within a single administrative domain are configured to send their requests to a single proxy server which then forwards the requests to their respective destinations. Frequently, requested documents are cached by the proxy, thereby improving client response time. See, Glassman, S., "A Caching Relay for the World Wide Web," Computer Networks and ISDN Systems, 27, 1994; Luotonen and K. Altis, "World Wide Web Proxies," Computer Networks and ISDN Systems, 27, 1994. However, Proxy Server Caching, while improving request response time, establishes a single point of failure, i.e., the proxy, and introduces an opportunity for data inconsistency.

Hypertext Transfer Protocol Redirect-Request is another proposed solution that provides for redirection of a client's request to an alternate server rather than responding to a client's request with the requested data. See, Fielding, R., J. Gettys, J. Mogul, H. Fryst, and T. Berners-Lee, "Hypertext Transfer Protocol—HTTP/1.1," Network Working Group, RFC 2068, 1997. This method improves the load balance and request response time, but does not address Web service reliability because the redirect server is still a single point of failure.

In a Server Cluster solution, a single dispatcher listens on a server's electronic internet protocol ("IP") address and assigns incoming requests in a round-robin manner to one of the Web servers in its local area network. See, Katz, E., M. Butler, and R. McGrath, "A Scalable HTTP Server: The NCSA Prototype," Computer Networks and ISDN Systems, 27, 1994. The Server Cluster solution improves reliability at the server end, but does not improve reliability of the path between the server and the client.

A Domain Name Aliasing solution associates a single host name with multiple IP addresses and various domain name servers assign the IP addresses in a round-robin manner to achieve load balancing among the servers. See, Brisco, T., "DNS Support for Load Balancing," Computer Networks and ISDN Systems, 28, 1996. However, Domain Name Aliasing does not address server reliability and availability.

A Server Co-location solution in which servers are replicated and provided with multiple direct connections to Internet backbones improves file request response time for files replicated on those servers and availability for clients close to the backbone, but does not affect response time of other clients, such as those on other continents. Also, the connection between the information provider and the co-located server still remains a source of possible failures.

SUMMARY OF THE INVENTION

Web performance and reliability can be improved by replicating. Web data among different-servers. In such configurations, if one server were to fail, clients could continue to satisfy their requests from other servers on which a replica of the same file resides. Such a solution solves the reliability issue. In addition, client requests could be directed to the fastest server on which a requested document resides, thereby improving the request response time. Furthermore, the method of replication may allow for the balancing of clients' requests among a varying number of servers thereby enabling cost-conscious scalability of Web service whereby a surge in a server's load may be handled by dynamically replicating frequently requested data or files on additional servers. However, such data replication is incompatible with the existing Web data location and retrieval scheme, namely, the physical, universal resource locator (URL) naming scheme which is a part of the Web hypertext transfer protocol (HTTP).

Therefore, it is an object of the present invention to provide a method for automatically managing files and fulfilling requests for such files that improves Web service reliability and performance.

It is another object of the present invention to provide location-independent logical references which cooperate with the existing location-dependent physical references (URLs) and HTTP protocol.

It is yet another object of the present invention to provide a method for fulfilling requests for files in which a request for the file may be satisfied by a plurality of servers.

It is still another object of the present invention to provide a method in which files are replicated on Web servers and in which a client's request for a file may be fulfilled by an alternate server should a particular server fail.

It is a further object of the present invention to provide a method in which the replication of files is automatically managed.

It is yet a further object of the present invention to provide a Web server capable of carrying out a method in accordance with the invention.

These and other objects are realized by an apparatus and method by which a user of a communications network may request and receive files over a network from a logical point of access using a logical reference to a file. A user working at a client computer on the network can request the transmission of a file such as through the selection of a hyperlink on a Web page. A list of references is appended to the file by the server before transmitting the file to the client. In response to the selection, the client computer selects a physical reference from the list of references at the client and requests the file using the selected physical reference. The list of references is taken from a replication directory maintained on the server storing the file. Additionally, the server appends or embeds a reference to a server selection program for selecting a physical reference to the file.

In the preferred embodiment, a physical reference is selected from the list of references which is most likely to provide the fastest response. If the file is not found at the physical reference selected, an alternate physical reference is selected until the file is found. The ability to request the file from a continuously updated list of physical references to the file (i.e., the replication directory) minimizes the occurrence of broken links and therefore enhances the reliability of Web service. Additionally, the ability to request a file using a logical reference, rather than a physical reference, enables replication of files on multiple servers while permitting access to replicas of the files without a need to reestablish links to the files. Furthermore, selection of the server on the basis of quickest expected response time enhances the performance of the Web service.

DETAILED DESCRIPTION

Figure 1:
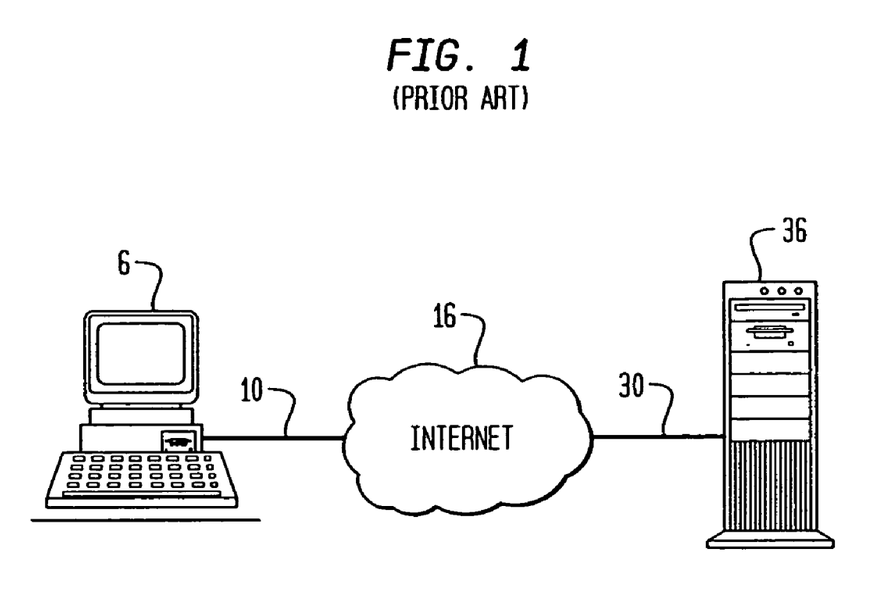
FIG. 1 is a symbolic diagram of a simplified World Wide Web topology of the prior art.

The present invention relates to interaction among computers in a communications network. FIG. 1 is a symbolic diagram of a simplified Web topology as known in the prior art. In the example of FIG. 1, the Web client 6 is the user's computer. The client may connect to the Internet 16, a sub-network of switching nodes and transmission links, via an Internet Service Provider ("ISP", not shown) over a communications line, using a modem in the client 6. The ISP typically has a dedicated connection over a transmission link to the Internet 16. The client's connection to the Internet 16, via the ISP, is shown symbolically at transmission link 10. A Web server 36 is connected to the Internet 16 by a transmission link 30. In actuality, the Web's topology is far more complex than suggested by the example shown in FIG. 1 with numerous servers, clients, proxies, transmission links, etc. which are simply shown as a black box, Internet 16, in FIG. 1. Using Web browser software running on the Web client, the user requests an image, document, multimedia or other data file (herein referred to collectively as "file") by selecting a hyperlink. Upon selection of a hyperlink, the Web client (e.g., the user's computer) submits a request to a server identified in the URL associated with the selected hyperlink. In a typical Web topology, a request is transmitted (in the form of an HTTP GET URL request identifying the file's URL) to the Web server 36 via the Internet 16 and transmission links 10 and 30. The Web server 36 responds to the request by transmitting the file identified in the URL via the Internet 16 to the client 6 for viewing, storing or printing.

The present invention provides a method and apparatus for satisfying a request for transmission of a file, using a logical reference which is later paired with a physical reference containing an electronic address at which the requested file may be located. The present invention further provides for a method of managing files by replicating Web files among various Web servers and deleting replicated data from such servers as necessary. The file management method is possible due to the implementation of a logical point of access to the file which is compatible with the present Web service. By using a logical request for a file, Web service reliability is enhanced in that a requested file will be received by the requesting client provided that there is at least one server on which the file is currently stored. This is an improvement over the prior art in which the file will be received only if the requested file is stored on the single server identified in the single URL associated with the traditional hyperlink. In addition, Web service performance is enhanced by selection of a fast server from a list of servers on which the requested file is stored.

A hyperlink used in connection with the present invention appears in the Web browser in the usual fashion. However, the hyperlink is not associated with a particular electronic address in the form of a traditional URL, but rather, is associated with a logical reference which uniquely identifies the file independently of an electronic address at which the file is located.

Figure 2:
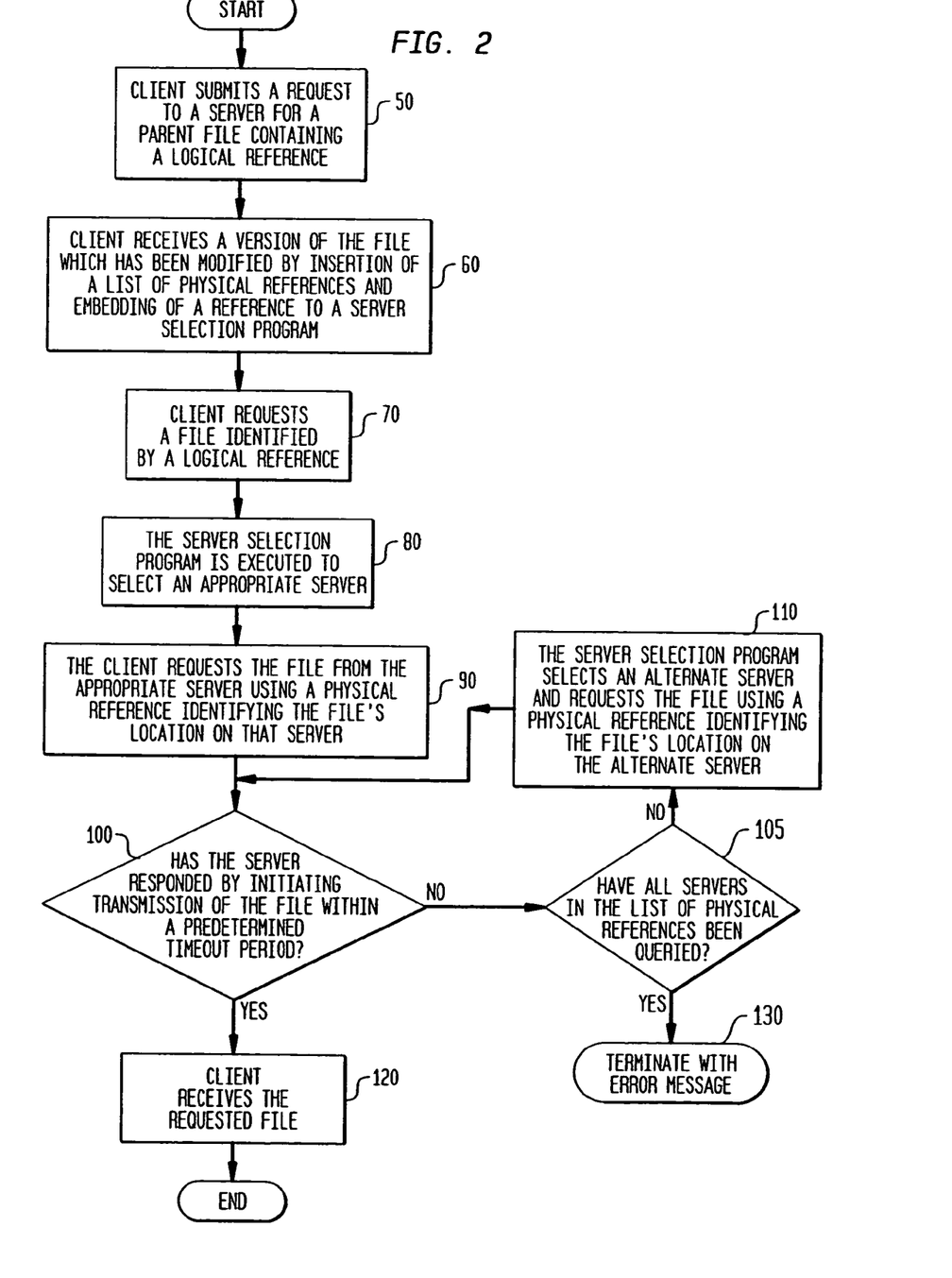
FIG. 2 is a symbolic diagram illustrating communication in accordance with the present invention from the client computer's perspective.

Referring now to FIG. 2, a client first submits a request to a server for a file containing a logical reference, most likely by selecting a hyperlink. The client and user are likely unaware at the time of the request that the file contains a logical reference. The client's request is shown in FIG. 2 at step 50. The file containing the logical reference is referred to herein as the parent file. As shown at step 60, in response to the client's request, the client receives a version of the parent file which has been modified by insertion of a list of physical references (i.e., traditional URLs) corresponding to the logical reference, and a reference to a computer program for selecting a server (hereinafter a "server selection program"). The list of physical references is inserted in the file by replacing a logical reference with a list of physical references and their corresponding logical reference to the file. For example, before sending the parent HTML file to a client, the server substitutes each logical reference in the file with an invocation of a JavaScript event handler which updates the value of the hyperlink reference when the hyperlink is selected. The new value of the logical reference is determined by the server selection program, which is referenced in the file. In other words, the server selection program takes the logical reference associated with a user-selected hyperlink and corresponding physical references as arguments and returns a selected physical reference. For example, in accordance with the invention, a hyperlink associated with the logical reference:

<A HREF="/radek/misc/fairytales.txt"> would be replaced by the server with

<A HREF=" " onClick="this.ref = document.Webpp.getUrl (
    /radek/misc/fairytales.txt,
    http://server1.com/radekfairytales.txt,
    http://server2.com/radek/fairytales.txt ) "> where /radek/misc/fairytales.txt is a logical reference, http://server1.com/radekfairytales.txt and http://server2.com/radek/fairytales.txt make up the list of physical references, and Webpp is the name of the server selection program, and a reference to the Webpp program is embedded elsewhere in the file. The server selection program may be received by the client along with the parent file. In a manner known in the prior art, as the client receives a skeleton of the parent file, i.e., a file including references to other embedded file, the client (Web browser) automatically requests transfer of each embedded image, file, etc. referenced in the parent file. Accordingly, the client may automatically receive the server selection program as part of the loading of the parent file.

A logical reference may be contained in the parent file either in association with a user-selectable hyperlink, or as one of the references embedded in the parent file. Upon a request for a file identified by a logical reference 70 (whether done automatically as with an embedded reference or by a user's conscious selection of a hyperlink), the server selection program is executed and an appropriate server is selected, as shown at step 80. This is preferably performed at the client by reference to the list of physical references appended to the modified version of the parent file before the server's transmission of the modified parent file to the client. The server selection program executed in step 80 will be described in detail in connection with FIG. 3.

Once the server selection program selects an appropriate server, the client requests the file from the appropriate server using the physical reference to the file on that server, as shown at step 90. In the preferred embodiment, the appropriate server is the server in the list of physical references which is most likely to provide the fastest response, as discussed hereinbelow. The server selection program then determines whether the queried server has responded, i.e., initiated transmission of the file, within a predetermined time, i.e., a timeout period, as shown at 100. If not, the server selection program determines whether all servers in the list of physical references have been queried, as shown in step 105. If not, the server selection program selects an alternate server from the list of physical references, and requests the file from the alternate server using another physical reference from the list identifying the file's location on the alternate server, as shown at 110. Step 100 is then repeated to determine whether the alternate server has responded by initiating transmission of the file, within the predetermined time. Steps 100, 105 and 110 are performed repeatedly until a server responds by initiating transmission of a file within the predetermined time or until all servers in the list have been queried. If a server initiates transmission of the file, the client receives the requested file as shown at 120. If all servers on the list have been queried and none have initiated transmission in step 100, the server selection program terminates with display of an error message at the client, as shown at step 100.

The ability to request the desired file from a plurality of servers enhances the reliability of Web service, since the user will receive the requested file provided that there is at least one server on the list which is storing the file at the time of the request.

As referred to above, in the preferred embodiment, the server selection program selects a server which is expected to provide the fastest response, and continues to select alternate servers, if necessary, by selecting the server expected to provide the next fastest response. Such a server selection criteria enhances the performance of Web service.

Figure 3:
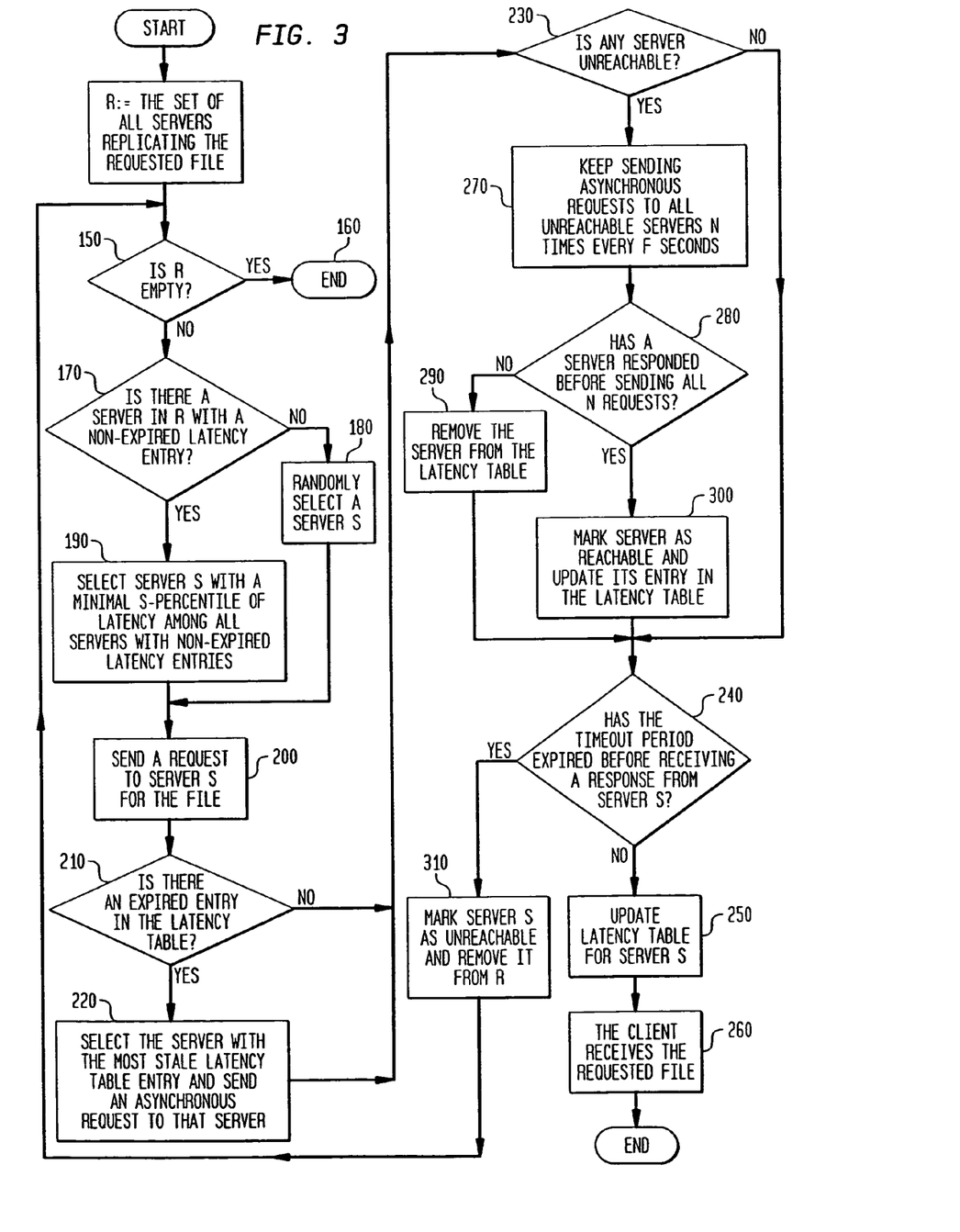
FIG. 3 is a symbolic diagram illustrating client and server communication in accordance with the present invention.

The method for selecting and querying a server performed in steps 80–130 of FIG. 2 is described hereinbelow with reference to FIG. 3. In FIG. 3, R is defined as the set of all servers replicating a file requested by a client, i.e., those contained in the list of physical references appended to the file in step 60 of FIG. 2. As a preliminary determination, the server selection program first determines whether R is an empty set, i.e., whether there are no servers replicating the file, as shown at step 150. If R is an empty set, i.e., there are no physical references associated with the logical reference corresponding to a client's request for a file, then the server selection program ends and displays an error message indicating that the file is unavailable, as shown at 160.

If R is not an empty set, i.e., there is at least one server in the list of physical references which replicates the file, the server selection program selects a server. Although the server may be selected in a variety of ways, e.g., based on server load, or the closest server (i.e., least number of hops), it is preferable that a server be selected which is expected to provide the fastest response time. In the preferred embodiment, this is achieved by reference to a latency table. The server selection program uses response times to past requests for each server to estimate the response time of the new request, as discussed below.

To select a server which is expected to provide the fastest response, the server selection program determines whether there is a server in R with a non-expired latency entry in a latency table, as shown in FIG. 3 at step 170. To provide a reliable estimate of request-latency, the server selection program keeps a small sample of "K" most recently measured latencies for each server where "K" is a system parameter. The latency table contains one entry per server. Each entry contains K samples. The latency table is preferably stored on the client so that it may be referenced during multiple invocations of the server selection program.

Using the sample, the server selection program estimates both the mean and standard deviation of latency for each server. The sample mean provides an estimate of request latency, while the sample standard deviation indicates how precise the estimate is of the mean. Specifically, the larger the standard deviation, the less likely it is that the latency of the next request is going to be close to the estimated mean.

In the preferred embodiment, the server selection program considers not only the estimate of the mean latency, but also the reliability of the estimate. This is achieved by combining both factors into a single metric by calculating an "S" percentile over request latency, where S is a system parameter. See Rade, L. and B. Westergren, Mathematic Handbook for Science and Engineering, Birkhauser, 1995 which is incorporated herein by reference. The S percentile provides an estimate of latency such that S % of latencies are likely to be below the estimate. For example, the sample mean is a 50-percentile.

If there is no server in R with a non-expired latency entry, the server selection program simply selects a server from the list, as shown at 180. In the preferred embodiment, the selection is made randomly by the server selection program. If there is a server in R with a non-expired latency entry, the server selection program selects a server S with a minimal S-percentile of latency among all servers with non-expired latency entries, as shown at 190. In either case, the client then sends a request to the selected server for the file, as shown at step 200, using an HTTP GET URL request.

Using stale samples for latency estimation may provide worse results than random server selection (for example, if the latencies have significantly changed since the last sample was taken). Accordingly, the server selection program must make sure that expired latency table entries, i.e., latency table entries containing stale samples, are periodically refreshed. In the preferred embodiment, each entry in the latency table has a corresponding timestamp (TS) indicating a time at which the most recently measured sample was measured and a time-to-live (TTL) period indicating the period of time for which the latency table entry is presumed fresh. Entries older than TTL at the time the latency table is referenced are considered expired. In other words, a latency table entry is refreshed after a period of time (TTL) after the timestamp (TS) corresponding to the latency table entry. TTL is a system parameter which must be chosen carefully to avoid an undue amount of extra network traffic. A latency table entry which corresponds to a newly inserted server is also considered stale.

The server selection program determines whether there is an expired entry in the latency table, as shown at step 210. If the server selection program finds an expired entry for any server in its latency table, it selects the server with the most stale sample and refreshes it by asynchronously sending an HTTP HEAD request to the server for a randomly chosen document, as shown at step 220. It should be understood that such asynchronous requests may be processed independently of serving clients' requests. If all servers replicating a given file have stale entries in the latency table, then the client randomly selects one of them.

In step 230, the server selection program determines whether any servers are marked as unreachable in the latency table. If not, in step 240, the server selection program determines whether a timeout period has expired before receiving a response from the queried server S. The timeout period is set upon the client's sending of a request to a server. This timeout period is the same as that referred to in step 100 of FIG. 2. The length of the timeout period is a system parameter. The timeout should reflect the expected response time of the server, which may vary, for example, depending on whether the server is located domestically or overseas. The server selection program determines whether a server is unreachable by determining whether the timeout has expired before receiving a response from the server. If the timeout period has not expired, i.e., the selected server is reachable, the server selection program updates server S's latency entry in the latency table, as shown at step 250, and the client receives the requested file, as shown at step 260.

If any server is marked as unreachable, the server selection program keeps polling all unreachable servers by asynchronously sending requests for a randomly chosen file N times every F seconds, as shown at step 270. The server selection program determines whether each server has responded to one of the asynchronous requests before sending all N requests, as shown at step 280. If the server(s) has not responded, it is removed from the latency table, as shown at step 290. If the server(s) has responded, the server(s) is marked as reachable and its entry in the latency table is updated, as shown at step 300. The server selection program keeps polling until a response is received or more than N unsuccessful attempts are made in which case the server entry is removed from the latency table. F and N are system parameters. In either case, in step 240, the server selection program next determines whether the timeout period has expired before receiving a response from the server(s) selected in step 180 or 190. If not, the latency table is updated and the client receives the requested file as shown at step 250. If so, the queried server S is marked in the latency table as unreachable and it is removed from the set R, as shown at step 310. The server selection program then repeats, starting with step 150, and selects an alternate server with the next fastest expected response time.

In accordance with the present invention, the server also plays an important role. Particularly, the server is responsible not only for responding to clients' file requests by modifying a file as described above, but also for maintaining a replication directory mapping logical references to physical references, replicating files, deleting replicas of files, updating replicas of files, and communicating update requests to other servers asking the other servers to delete replicas and to update a genealogy tree.

Figure 4:
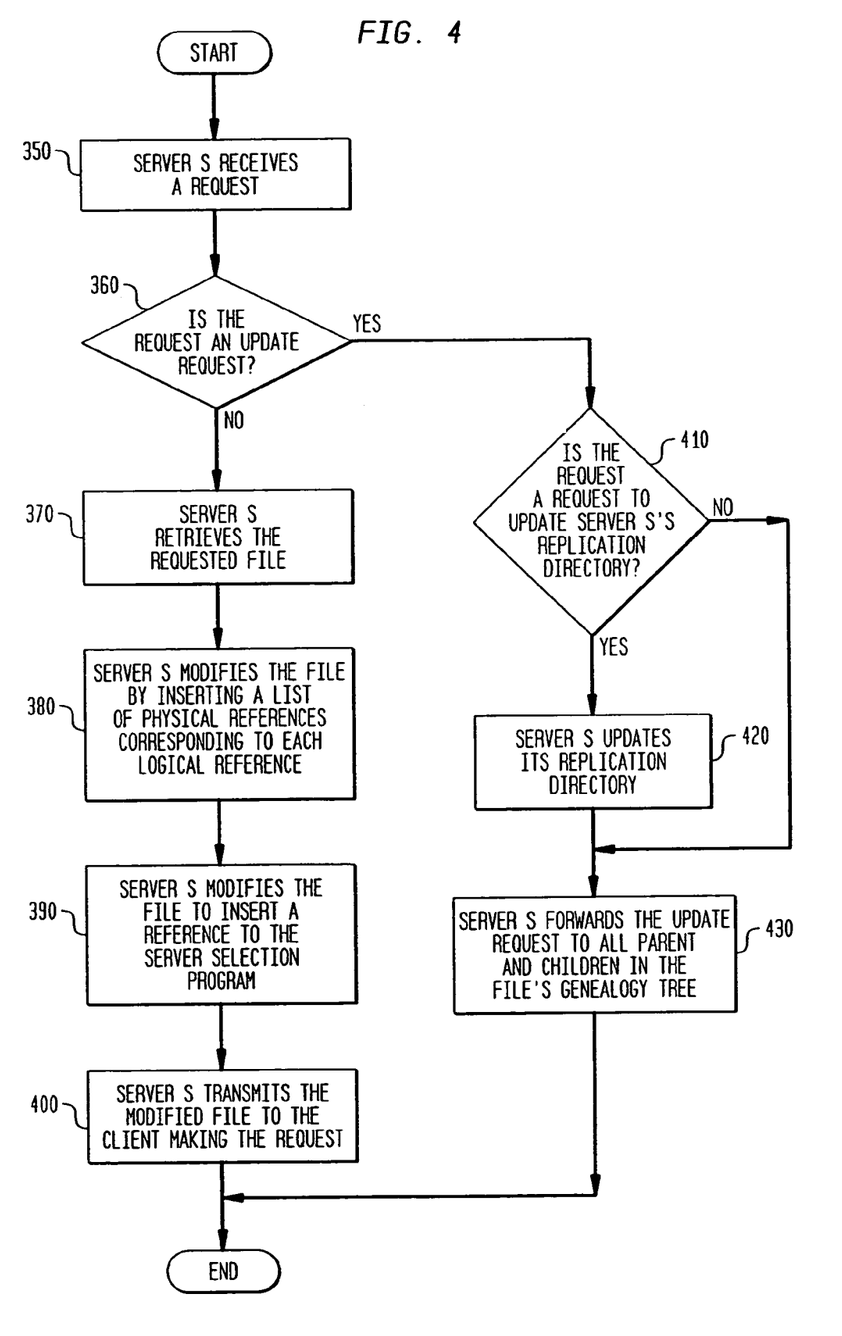
FIG. 4 is a symbolic diagram illustrating communication in accordance with the present invention from the server computer's perspective.

The server's role is described below in reference to FIG. 4. In accordance with the present invention, the server S first receives a request as shown at step 350. The server S then determines whether the request is an update request, as shown at 360. An update request is a request sent from another server requesting an update to a replication directory such as shown in step 270 of FIG. 3. The update may be in the form of an addition or deletion of a physical reference to a file or in the form of an update to a server's status as a parent or child in an entry existing in the replication directory, or both.

As referred to above, each server maintains a replication directory mapping each logical reference to one or more corresponding physical references. If the request is not an update request, it is considered to be a request for transfer of a file from a client. In this context, it is reasonable to assume that a request received from a server is either an update request from a server or a file transfer request from a client. If the request is not an update request, the server retrieves the requested file as shown at step 370. The server then modifies the file by replacing each logical reference with a list containing the logical reference and corresponding physical references. The list information is taken from server S's replication directory, as described above, and as shown at step 380. The server also modifies the file to add a reference to the server selection program discussed above, as shown at 390. The server then transmits the modified file to the client as shown at step 400. The client loads the file in the usual fashion, including the requesting of files identified by references embedded in the file, such as the server selection program.

The server must maintain an up-to-date replication directory for reliable Web service. Accordingly, if the server determines in step 360 that the request is an update request, the server next determines whether the request is a request to update server S's replication directory, as shown at step 410. If it is such a request, in step 420, server S updates its replication directory to add, delete, or modify an entry in server S's replication directory. In step 430, server S then forwards the update request to its parent and all of its children in a genealogy tree of the file as discussed further below. If the request is a request to update another server's replication directory, server S simply skips step 420 and proceeds to step 430 to forward the update request to its parent and children.

In aforementioned step 420, based on its local server load information, each server may autonomously determine whether or when to create a replica of a file on another server or to delete one of its own files or a replica of the file that exists on another server. If the server chooses to create or delete a replica, it updates its own replication directory and propagates an update request to other servers. The updates to replication directories happen in a completely distributed manner without any central coordinator. Algorithms which dynamically decide whether or when to replicate a document on another server have been described in Breitbart, Y., R. Vingralek, and G. Weikum, "Load Control in Scalable Distributed File Structures," Distributed and Parallel Databases, 4(4), 1996, and Vingralek, R., Y. Breitbart, and G. Weikum, "SNOWBALL: Scalable Storage on Networks of Workstations," Distributed and Parallel Databases, 6(2), 1998, which are herein incorporated by reference. Similarly, algorithms for maintaining consistency of replicas have been described in Helal, A., A. Heddaya, and B. Bhargava, "Replication Techniques in Distributed Systems," Kluwer Academic Publishers, 1986; Terry, D., M. Theimer, K. Petersen, A. Demers, M. Spreitzer, and C. Hauser, "Managing Update Conflicts in Bayou, a Weakly Connected Replicated Storage System," In Proceeding of the ACM SIGOPS Symposium on Principles of Operating Systems, 1995; Breitbart, Y. and H. Korth, "Replication and Consistency: Being Lazy Helps Sometimes," In Proceeding of the 16$^{th}$ ACM SIGACT-SIGMOD-SIGART Symposium on Principles of Database Systems, 1997, which are incorporated herein by reference. A variety of algorithms may be appropriate depending upon whether one copy serializability or eventual data conversion is more favorable.

Because the updates occur in a completely distributed manner, it is possible that some replication directories may become inconsistent. For example, an inconsistency may occur when (1) a first server decides to create a replica of a file on a second server and sends an update request to the second server to a server's replication directory, (2) the second server later deletes its replica of the file and sends an update request to delete the second server from the replication directory, and (3) a third server receives the update requests in reverse order and updates its replication directory in reverse order. In other words, the third server first deletes the second server from its replication directory for the file and then subsequently adds an entry for the second server in the replication directory for the file. Therefore, the third server will incorrectly inform all clients that the file is replicated on the second server.

Figure 5:
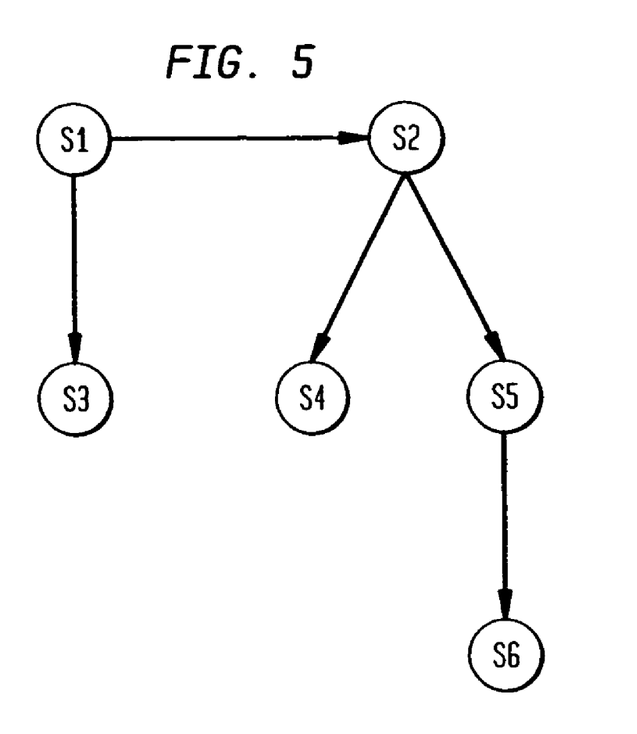
FIG. 5 is a symbolic diagram of an example of a genealogy tree of a file in accordance with the present invention.

In order to ensure that all updates are delivered among the servers in the proper order, a genealogy tree is preferably maintained for each replicated file. An example of a genealogy tree is described in reference to FIG. 5. In the example of FIG. 5, if server S1 creates a replica of file F on server S2, an edge S1–S2 is added to a genealogy tree for file F. The tree is constructed in a distributed manner, such that the tree is not stored on a particular server. Rather, each server knows only its parent and its children. Accordingly, the tree structure is spread across many servers there is no need for maintaining an additional data structure since both parent and children are always represented in the replication directory of the file. Therefore, it is sufficient to mark each server in the replication directory of server S as either a parent or child of server S.

Addition of new nodes to the tree occurs whenever a server creates a replica of a file on another server. Deletion of nodes from the tree occurs when a server decides to delete a replica of a file, either as a response to an update request sent from another server or as an autonomous decision, as described above. In a case of deletion, the server appends all of its children to its parent and informs the children about their new parent. In other words, server S sends an update request to its former parent and children requesting that the former parent's replication directory be updated to delete server S as a child of the parent and to add server S's former children as children of S's former parent. Additionally, S's children receive an update request requesting that server S be deleted as the former child's parent and that S's former parent be added as the former child's parent.

Figure 6:
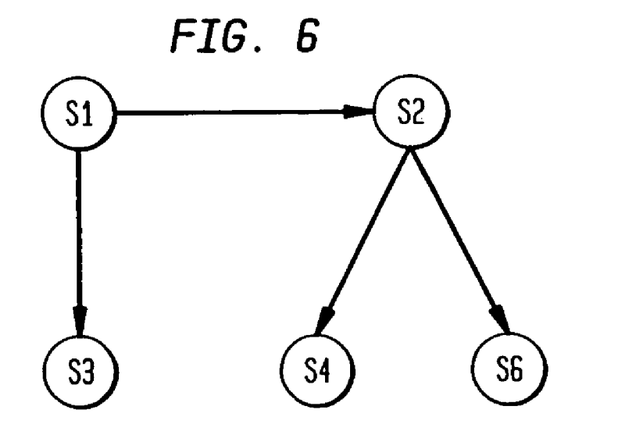
FIG. 6 is a symbolic diagram of the genealogy tree of the example shown in FIG. 5 after deletion of a server from the tree.

FIG. 6 shows the genealogy tree resulting, in the example of FIG. 5, from server S5's deletion from the tree. If the server deleting the replica is the root of the genealogy tree, it selects one of its children to act as a new root and sends appropriate update requests. If the server deleting the replica is the root and has no children, it is the last server replicating the file and it simply deletes the entry corresponding to the file from its own replication directory. The reconnection is done automatically, i.e., the server does not process any other update requests until all reconnection requests are acknowledged.

However, inconsistencies in the tree still may occur. Consider, for instance, the example of FIG. 5. Server S5 could delete its replica of the file and then reconnect the tree to form the tree shown in FIG. 6 and send update requests to servers S2 and S6 to delete server S5 from their replication directories for the file. Server S2 updates its own replication directory and then forwards the update request to servers S1 and S4. If, after these steps, server S3 decides to replicate file F on server S5, server S5 becomes a child of server S3 and adds itself to its own replication directory for file F and forwards the update request to server S3 which in turn forwards the update request to server S1. If server S1 first receives the update request from server S3 and then the update request from server S2, S1 deletes server S5 from its replication directory for file F. This is the result of server S5's propagation of conflicting update requests from different positions in the genealogy tree.

This inconsistency can be avoided if server S3 is forced to wait until it receives the update request from server S1 about deletion of the replica of the file on server S5 before creating a replica of the file on server S5. Accordingly, in a preferred embodiment, consistency is achieved by sending a local timestamp indicating the time of deletion of the file along with each update request that deletes a replica of a file. Thus, in the example of FIGS. 5 and 6, server S5 sends a timestamped update request disclosing the deletion. The timestamp is transmitted to other servers along with the request to delete. After a server, such as server S3, receives such a timestamp, it keeps its copy of the timestamp (one per server and file). Then, when server S3 later sends an update request to server S5 to replicate the file, it piggybacks on the update request the most recent timestamp it has received from server S5 for the file. If server S5 receives an older timestamp than its own private timestamp, it rejects the update request from server S3.

In the preferred embodiment, servers batch several update requests into a single update request. For example, when several files are replicated, it is unnecessary to send an update request for each of them. In the preferred embodiment, the logical reference suffixes may include a wildcard in the replication directory to indicate a set of files which are replicated on a server or servers. Additionally, it may be preferable to relax the requirement of permanently keeping timestamps for every server document combination, and simply keep timestamps for a certain period of time. If a server removes a timestamp prematurely, then it will not be able to replicate the given document on the given server until it receives a new timestamp. However, in many circumstances, this may be an acceptable compromise. Additionally, it should be noted that, due to the JAVA applet security model, which requires an applet, e.g., the server selection program, to operate within a "sandbox", it is advantageous to use object signing technology to verify the signs of the server selection program. Accordingly, the server selection program may be securely provided access to the latency table on the client and be securely permitted to retrieve a file from a server other than the server from which the server selection program was received.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A server computer comprising:
a memory for storing programs and data;
a processor for executing programs;
a program, stored in the memory and executable by the processor, for transmitting, responsive to a request therefor, a parent file containing a logical reference uniquely identifying a desired file independently of a network address, the program being capable of modifying the parent file by inserting a list of electronic addresses corresponding to the logical reference contained in the parent file before transmitting the parent file to the client;
a second program for modifying the parent file by inserting a reference to a program for selecting a server upon a request for a certain desired file identified by a logical reference before transmitting the parent file to the client;
a third program for identifying a status of each server identified in each electronic address in the replication directory as either a parent or child of the server in a genealogy tree representing servers storing the file; and
a fourth program for tracking the server's load and to autonomously determine when, on the basis of the server's load, to delete one of the server's files, to delete the file, to update the server's replication directory to remove the electronic address of the file on the server, and to propagate an update request to all parent and children of the server in the replication directory requesting the parent and children to update their respective replication directories;
wherein the server stores in the memory a replication directory associating logical references to files with electronic addresses of the files stored on a plurality of servers, the list of electronic addresses being excerpted from the replication directory.

2. The server of claim 1, further comprising a fifth program for tracking the server's load and to autonomously determine when, on the basis of the server's load, to create or delete a replica of one of the server's files on another server, to create or delete a replica on another server, to update the server's replication directory to add or delete the electronic address of the file on the other server, and to propagate an update request to all parent and children of the server in the replication directory requesting the parent and children to update their respective replication directories.

3. The server of claim 2, further comprising a sixth program for updating the status of a server in the replication directory from child status to parent status when the server computer deleting the file is a root of the genealogy tree.

4. The server of claim 3, further comprising a seventh program for batching several updates into a single update request.

5. The server of claim 4, further comprising a eighth program for transmitting to another server, along with an update request, a local timestamp indicating the time at which an update to the server's replication directory was made, the other server receiving and retaining a record of the timestamp and updating the replication directory if the last received timestamp is more recent that the retained timestamp.

6. The server of claim 5, further comprising a ninth program for retaining the timestamp for a limited period of time, the other server updating the replication directory if a timestamp is received along with an update request and no timestamp is then retained by the other server.

* * * * *